United States Patent

Later

[11] Patent Number: 5,259,962
[45] Date of Patent: Nov. 9, 1993

[54] METHOD AND APPARATUS FOR DECONTAMINATION OF SOILS AND OTHER PARTICULATE MATERIALS

[76] Inventor: Roger C. Later, 1427 Euclid St., Santa Monica, Calif. 90404

[21] Appl. No.: 939,395

[22] Filed: Aug. 31, 1992

Related U.S. Application Data

[63] Continuation of Ser. No. 707,484, May 30, 1991, abandoned.

[51] Int. Cl.⁵ .............................................. F23G 5/12
[52] U.S. Cl. ........................... 210/758; 110/226; 210/768; 210/180
[58] Field of Search ............ 110/226, 236, 346; 422/231; 210/767, 608, 674, 677, 694, 748, 759, 763, 180, 758, 768

[56] References Cited

U.S. PATENT DOCUMENTS

| | | | |
|---|---|---|---|
| 4,834,836 | 5/1984 | Wemhoff | 210/180 X |
| 4,861,484 | 8/1989 | Lichtin et al. | 210/638 |
| 4,882,021 | 12/1989 | Barnhart | 204/158.21 X |
| 4,977,839 | 12/1990 | Fochtman et al. | 110/226 X |

Primary Examiner—Frank Spear

[57] ABSTRACT

Solid materials, such as soils, containing contaminants are treated with hydroxyl radicals, in the gas phase. The hydroxyl radicals are created by hydrogen peroxide or ozone, preferably a combination of hydrogen peroxide, ozone and UV light. A decontamination unit for on-site use in the treatment of contaminated solid materials, such as contaminated soil is a totally enclosed closed-loop system.

27 Claims, 1 Drawing Sheet

METHOD AND APPARATUS FOR DECONTAMINATION OF SOILS AND OTHER PARTICULATE MATERIALS

This application is a continuation of application Ser. No. 07/707,484 filed May 30, 1991, entitled "METHOD AND APPARATUS FOR DECONTAMINATION OF SOILS AND OTHER PARTICULATE MATERIALS" by Roger Carson Later, and now abandoned.

BACKGROUND OF THE INVENTION

The invention relates to methods and apparatus for decontaminating solid materials, in particular solid materials in particulate form.

There is an ever-increasing need for efficient and effective methods and apparatus to remove contaminants from soil, sand and other solid materials. In particular, toxic organic substances such as petroleum hydrocarbons and various derivatives thereof have been relatively intractable using known methods for treatment of solid materials.

The utility of ozone or hydrogen peroxide as oxidizing agents for use in the treatment of aqueous waste solutions and other contaminated waters, to remove certain types of organic pollutants, is known. For example, U.S. Pat. No. 4,395,337 to Ciepela describes treatment of brackish water, wherein residual oil is stripped by treatment with ozone. U.S. Pat. No. 4,230,571 to Dadd and U.S. Pat. No. 4,504,445 to Walz describe treatment of water, wherein ozone is generated by ultraviolet radiation; in addition, Dadd notes that the ultraviolet radiation may act as a catalyst for disinfecting and oxidizing action by the ozone. U.S. Pat. No. 4,416,786 to Knorre et al. and U.S. Pat. No. 4,591,443 to Brown et al. similarly describe the use of hydrogen peroxide in the treatment of waste water.

The reactions of ozone or hydrogen peroxide with waste water are quite complex and to date are not completely understood. It is generally recognized, however, that the hydroxyl radical is an important intermediate. The hydroxyl radical functions both in the direct oxidation of organic contaminants and in the generation of additional radicals for participation in further reactions. It is known that hydroxyl radicals are formed by exposure of ozone or hydrogen peroxide to ultraviolet light ($<400$ nm).

U.S. Pat. No. 4,792,407 to Zeff et al. describes a method of oxidizing organic contaminants in aqueous solutions which comprises using, in combination, ozone, hydrogen peroxide and ultraviolet radiation. Zeff, et al., discloses exposing contaminants to ozone either subsequently to or simultaneously with exposure to UV and hydrogen peroxide. Addition of hydrogen peroxide to the UV/ozone combination in such aqueous systems is reported to result in an increased efficiency of oxidation.

SUMMARY OF THE INVENTION

In accordance with the present invention there is provided treatment of solid materials, such as soils, containing contaminants, whereby the oxidative capabilities of hydroxyl radicals, in the gas phase, are exploited. The hydroxyl radicals are created by hydrogen peroxide or ozone, preferably a combination of hydrogen peroxide, ozone and UV light. In a preferred embodiment, the rate of hydroxyl formation, in the gas phase, is controlled through the staged introduction of ozone and hydrogen peroxide to achieve controlled oxidation of the contaminant materials.

Further, in accordance with the invention, there is provided a novel decontamination unit for on-site use in the treatment of solid materials, such as soil. In a preferred embodiment of the apparatus in accordance with the invention the decontamination unit is a totally enclosed closed-loop system.

DETAILED DESCRIPTION OF THE INVENTION

Figure 1:
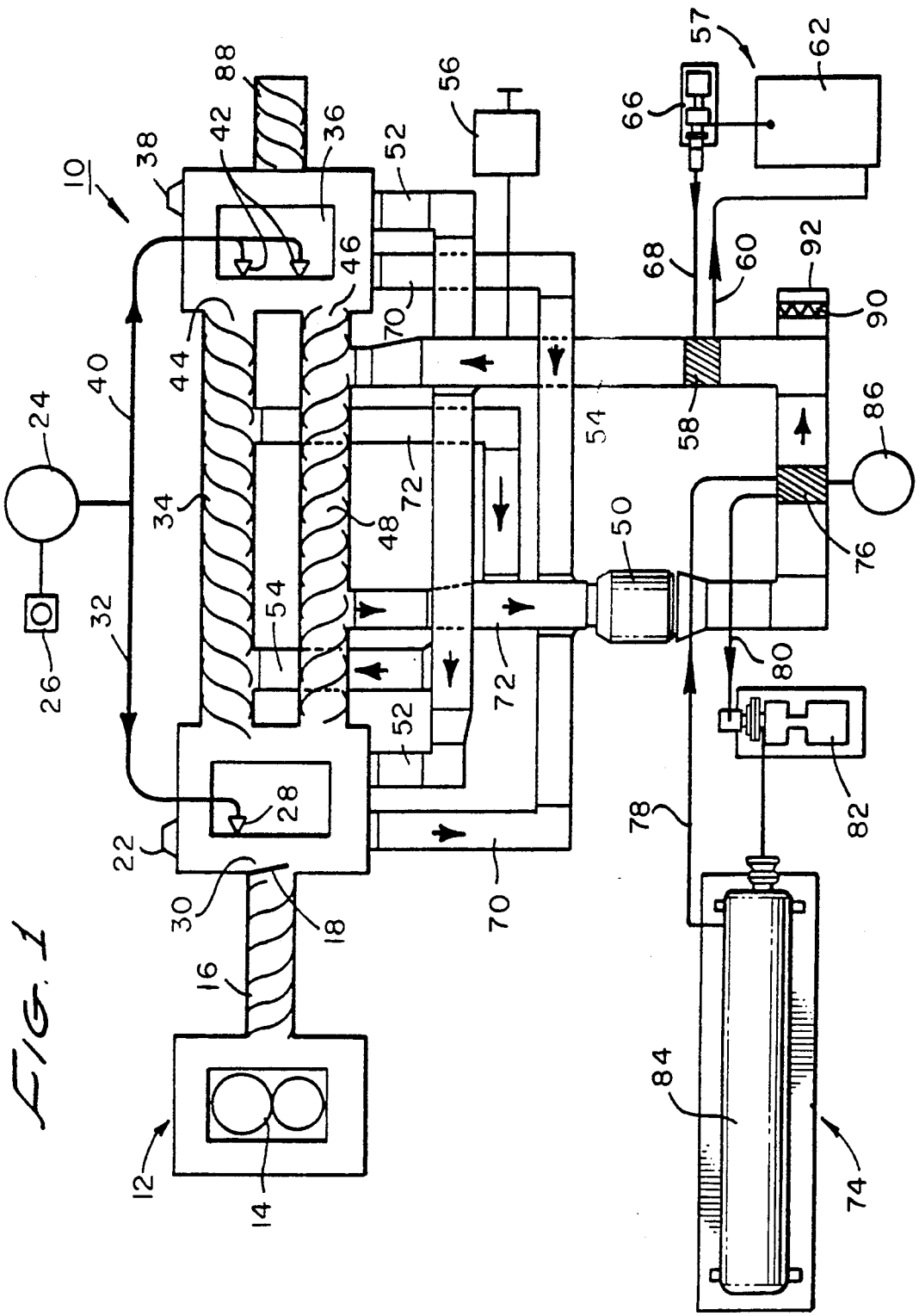
FIG. 1 is a schematic view of a decontamination unit in accordance with the invention.

In accordance with the present invention, it has been determined that treatment of solid materials containing contaminants, including organic contaminants, with gas phase hydroxyl radicals permits the rapid and economical elimination of a wide variety of contaminants. For example, in accordance with the present invention, light-end hydrocarbons contaminants are readily removed from soil or other solid materials. The methods and apparatus in accordance with the invention are particularly useful in removing hydrocarbon contaminants containing from one to eighteen carbon atoms, such as unleaded gasoline, kerosine, Jet A and Jet B fuels. In addition, the present invention is useful in removing hydrocarbon derivatives, including partially oxidized organic materials, such as alcohols and ketones; halogenated hydrocarbons; and a variety of pesticides, including those containing chlorine and phosphorous.

The hydroxy radicals are created by hydrogen peroxide or ozone, preferably by a combination of hydrogen peroxide, ozone and UV light. While not being bound to any particular theory of operation, it is believed that this combined treatment leads to the optimum generation of gas phase, hydroxyl radicals, which in turn react with the contaminants. For example, it appears that the hydroxyl radicals react with hydrocarbon contaminants, so as to break down the hydrocarbon chain. Surprisingly, the gas phase generation of hydroxyl radicals is apparently not dependent upon the same reactions as produce hydroxyl radicals in an aqueous-phase.

The methods and apparatus in accordance with the present invention take advantage of the high reactivity of the hydroxyl radicals formed in gas phase mixtures of hydrogen peroxide, ozone and UV light, compared to the reactivity of hydroxyl radicals formed in aqueous solutions. The reactivity of hydroxyl radicals in aqueous solutions is diminished, because of the recombination of hydroxyl radicals in aqueous solvent cages to reform hydrogen peroxide, as well as the decomposition of hydroxyl radicals, in the aqueous phase, by collision with nonpollutant species such as $CO_3^{-2}$. In the gas phase many of these effects are eliminated by keeping the water content at a minimum. In so doing, the hydroxyl radicals are made surprisingly effective in their reactions with contaminants.

The advantages include:

A) The large reaction rate constants for gas phase hydroxyl radicals. The reaction rate constants for hydroxy radicals in the gas phase are on the order of $10^{10}$–$10^{11}$, while the reaction rate constants in water are only on the order of $10^7$–$10^9$ and the reaction rate constants of ozone in water, are only on the order of $10^1$. It can be seen that the gas phase hydroxyl radical is much more reactive. The increased reactivity makes the decontamination process of the instant invention more efficient and complete and thorough than corresponding aqueous decontamination processes.

B) The strong reactivity of compounds that are resistant to aqueous phase treatment by hydrogen peroxide, ozone and UV light. In particular, hydrocarbon fuels, chlorinated pesticides and to a lesser extent aromatic compounds have a much greater reactivity with hydroxyl radicals, in the gas phase, than with hydrogen peroxide, peroxy or ozone or combinations of ozone, hydrogen peroxide and UV light in aqueous phase.

Contaminated soil or other solid material is loaded directly into a totally enclosed closed-loop decontamination unit 10, via an entry hopper 12. To facilitate treatment, the entry hopper 12 contains a means for comminuting the solid material 14, for example by shredding the solid material to a sandy particle size. The particle size is typically from about 1 mm$^3$ to about 64 cm$^3$, preferably from about 1 m$^3$ to about 27 cm$^3$, more preferably about 1.25 cm$^3$.

Of course, no comminuting is necessary when the material to be treated has an appropriate particle size, as is the case, for example, when activated charcoal is regenerated. In such cases, comminuting can be omitted without serious impact of the efficacy of the invention.

The material to be treated is then transferred by a first transfer means. The transfer means is a covered, first soil auger 16, such as one manufactured by Screw Conveyor Company, Visalia, Calif. A means for preventing backflow 18 is located at or near the entry port 30 to the first soil auger. It seals the entry hopper 12, from the rest of the decontamination unit 10, once the treatment process begins.

The material is transferred by the soil auger 16 into a first treatment hopper 20, containing a first UV light port 22. The UV light port 22 permits UV light (i.e., light with a wavelength of less than 400 nm), from a UV light source, such as the sun, (not shown) to enter the first treatment hopper 20.

Hydrogen peroxide is applied to the contaminated material in the first treatment hopper 20. UV light is preferably employed as a catalyst. Further, the treatment with hydrogen peroxide is preferably carried out in conjunction with the application of ozone. Contamination levels are site-specific. Accordingly, the amount, concentration and combination of hydrogen peroxide, ozone and UV light will vary in accordance with the nature and relative concentrations of contaminants at a given treatment site. The amount, concentration and combination to be used, in a particular instance, will be readily determinable by one skilled in the art, without undue experimentation.

The hydrogen peroxide is stored in storage tank 24. The pressure of the hydrogen peroxide is controlled by an air pump 26 operationally connected to the storage tank 24.

The hydrogen peroxide is applied to the contaminated material by conventional techniques, such as by spray nozzle 28 located above the entry port 30 into the first hopper 20. The hydrogen peroxide is fed from the storage tank 24 to the nozzle 28 through a first hydrogen peroxide supply line 32.

The hydrogen peroxide produces gas phase hydroxyl radicals which causes the oxidative breakdown of the contaminants—an exothermic reaction. Any suitable amount of hydrogen peroxide can be applied to the contaminated material. The amount to be employed at a particular site depends on such factors as the types and concentrations of contaminants and the type of material being treated.

The amount added should be sufficient to initiate a controlled oxidation reaction. Enough should be added that oxidation, as evidenced by a rise in temperature in the first treatment hopper 20, occurs. If too much is initially added, the oxidation can become too vigorous and the temperature can rise to undesirably high levels. Generally, the temperature in the first treatment hopper 20 from about 100° C. to about 200° C., preferably about 110° C. to about 150° C.

The ratio of contaminated soil to hydrogen peroxide to be employed to treat a particular soil will be readily determinable by one skilled in the art without undue experimentation. Typically a weight ratio of contaminated soil to hydrogen peroxide of from about 8.0:1 to about 1:1, preferably from about 5.0:1 to about 2.2:1, is effective. The hydrogen peroxide is suitably applied in a wide range of concentrations. Concentrations of from about 35% to about 100% are employed. While it is desirable to keep the water concentration to a minimum, because of the difficulty of handling 100% hydrogen peroxide, concentrations of about 50% are preferred.

After application of the hydrogen peroxide, the material is kept in the first treatment hopper 20 until a controlled oxidation is established. The residence time in the first treatment hopper 20, for a particular treatment, will depend upon the material to be treated and the contaminants to be removed. Typical residence times range from about 10 seconds to about 10 minutes, preferably from about 15 seconds to about 5 minutes, more preferably about 15 seconds.

After the initial treatment, the material is transferred by a second covered soil auger 34 to a second treatment hopper 36, which is fitted with a second UV light port 38. If the material still contains some contamination, it is again treated with hydrogen peroxide, preferably in combination with UV light and ozone.

The hydrogen peroxide is fed to the second treatment hopper 36 from the storage tank 24 through a second hydrogen peroxide supply line 40 to spray nozzles 42, located at the second hopper entry port 44 and the second hopper return port 46, respectively. Sufficient hydrogen peroxide is added to initiate or maintain the controlled oxidation of the remaining contaminants. The temperatures in the second treatment hopper 36 ranges from about 100° C. to about 200° C., preferably about 110° C. to about 150° C.

The residence time in the second treatment hopper 36 will depend upon the material to be treated and the contaminant to be removed. Typical residence times are from about 10 seconds to about 10 minutes, preferably from about 15 seconds to about 5 minutes, more preferably about 15 seconds. If the material still contains some contamination, the material is returned to the first treatment hopper 20, by a third covered soil auger 48 and the treatment is repeated, until no contaminants remain.

Particle movement via the soil augers 34 and 48 15 stirs the solid material to achieve even application of the hydrogen peroxide. The stirring further serves to dilute concentrations of contaminants, and to maximize the contact between the particles and the hydrogen peroxide.

The speed at which the augers 34 and 48 move the solid material is adjustable, thereby allowing soil residency time in the treatment hoppers, 20 and 36, to be adjusted. The slower the augers are turned, the longer the residency time. Typical auger speeds are from about 0.5 yd$^3$/hr to about 25 yd$^3$/hr, preferably from about 10 yd$^3$/hr to about 20 yd$^3$/hr, more preferably about 18 yd$^3$/hr.

Auger speed variability can be achieved through a variety of means. A representative means is a frequency invertor power controller (not shown) sold by Loyola Industries under the trade name DPAC-1-S.

Air is circulated through the treatment hoppers, 20 and 36, and the soil augers, 34 and 48, by supply fan 50. Air supply ducts 52 provide clean, ozone-rich air to the treatment hoppers, 20 and 36, while air supply ducts 54 provide clean, ozone-rich air to the augers, 34 and 48.

Ozone, produced by an ozone generator 56, is initially introduced into the decontamination unit 10 through air supply duct 54. Any suitable concentration of ozone can be employed. The amount will vary in accordance with the nature and relative concentration of contaminants at a given treatment site. The amount will be readily determinate by one skilled in the art, without undue experimentation. In general, ozone is employed in concentrations up to about 3%, preferably from about 1% to about 2%, based on the composition of the gas phase. The ozone concentration is monitored by an ozone sensor (not shown) located at the intake of the supply fan 50.

The ozone can be generated by a variety of systems. A preferred system is manufactured by PCI Ozone and Control Systems, Inc., West Caldwell, N.J. This system generates ozone by a corona discharge method. Alternative systems can be employed, as the source of the ozone is not critical. Indeed, the use of ultraviolet radiation within the closed reaction chamber will itself generate a certain amount of ozone.

The air within the decontamination unit 10, is heated by a hot water assembly 57. A hot water coil 58 is located in air supply duct 54. After passing through the coil 58, water travels through a hot water return pipe 60, to a hot water boiler 62, through a hot water circulating pump 66, and then back to hot water coil 58 through a hot water supply pipe 68. A useful boiler assembly is manufactured by Teledyne Laars, North Hollywood, Calif. During some treatments, however, the controlled oxidation is sufficiently exothermic, that no additional heat needs to be added to the decontamination unit.

The augers 34 and 48 are heated to a temperature sufficient to evaporate contaminants, hydrogen peroxide and treatment by-products trapped in or absorbed by the solid material. The temperature in augers 34 and 48 is generally from about 5° C. to about 110° C., preferably from about 25° C. to about 110° C., more preferably about 100° C. The movement of the augers, 34 and 48, enhances the rate at which contaminants, hydrogen peroxide and treatment by-products evaporate from the solid material.

Evaporation of the contaminants and hydrogen peroxide is critical to the decontamination process, because it facilitates contact between the contaminants and gas phase hydroxy radicals. Evaporation also keeps the treatment by-products, generally a mixture of carbon dioxide and water (when the contaminants are organic contaminants) in the vapor state, so that the water can be subsequently removed by condensation.

Post-treatment air, containing contaminants and treatment by-products, is removed from the treatment hoppers, 20 and 36, through air return ducts 70 and from augers, 34 and 48, through air return ducts 72.

The return air lines, 70 and 72, pass the post-treatment air through a chilled water system 74. The chilled water system 74, contains a chilled water coil 76 which removes water and reaction by-products from the air by condensation. The chilled water coil 76 is cooled by water from a chilled water supply pipe 78. The chilled water is recirculated through a chilled water return 80 pipe, which returns the water through chilled water pump 82, into water chiller 84 and then back to the chilled water supply line 78. Representative of the cooling systems which can be employed in accordance with the invention is the water cooling system manufactured by Marley Company, San Gabriel, Calif.

The condensate is collected in a suitable condensation tank 86 for disposal or recovery thereof. It is important that the condensate be removed from the system, to prevent the water from reacting with the hydroxyl radicals, thereby impeding the decontamination reactions. The condensation tank 86 contains an activated charcoal water condensate filter (not shown) to trap any contaminants that may be condensed and collected with the water by-product.

The material is cycled between the first and second treatment hoppers, 20 and 36, until the contaminants have been removed. In those embodiments where the contaminants are hydrocarbon contaminants, a hydrocarbon sensor (not shown) located in the first treatment hopper 20 monitors the level of unreacted hydrocarbons remaining in the air (and, therefore, in the soil as well). A thermometer (not shown) located in one of the return air ducts 72 associated with the soil augers, 34 and 48, measures the heat generated by oxidation of the contaminants. When the sensor indicates that there are no further hydrocarbon vapors within the system and the thermometer indicates that no heat is generated by the oxidation of contaminants, then the soil is removed from the decontamination unit 10, by a discharge auger 88, operationally connected to the second treatment hopper 36.

The ozone which remains in the decontamination unit lo is then exhausted through an activated charcoal/catalytic filter 90 and out through an exhaust port 92. The activated charcoal/catalytic filter 90 is used to substantially eliminate the discharge of ozone into the atmosphere. A preferred system is manufactured by PCI Ozone and Control Systems, Inc., The exhaust port 92 is normally sealed by a weighted damper (not shown). However, should there be a sudden increase in the pressure inside the decontamination unit, because of an undetected "hot spot" of contamination, the increased pressure will be vented through the activated charcoal/catalytic filter 90, before being released into the atmosphere.

In some embodiments, the decontamination unit is mounted on a suitable means of transport, such as a flat bed trailer. Such embodiments facilitate movement to and operation at sites where contaminated material is to be treated.

The method in accordance with the invention can be carried out at any suitable temperature. For example, it is possible to excavate contaminated soil at a given site until the soil is frozen (0° C.), so that the soil added to the entry hopper will have a temperature of only about 0° C.

To begin treatment, the solid material to be treated is loaded into the entry hopper 12. The ozone generator 56, the chilled water system 74, and the air pump 26 are activated. The boiler assembly 57 can be activated depending on the vapor point of the contaminant.

While the first soil auger 16 pushes a portion of contaminated material through the backdraft damper 18, misting of the hydrogen peroxide is initiated.

The second soil auger 34 is then activated and introduction of ozone into one of the air supply ducts 54 is begun. The supply fan 50 is turned on to circulate ozone-rich air through the decontamination unit 10. Monitoring of the hydrocarbon vapor content in the first treatment hopper 20 and of the temperature and ozone content in the air return line 72 is begun. In addition, the activated charcoal water condensate filter in the condensation tank 86 is monitored to check for any contaminants that may be condensed and collected with the water and reaction by-products.

When the monitoring of the temperature indicates that no additional heat is being generated, i.e. when the contaminants have been completely oxidized, the discharge auger 88 is automatically activated to discharge the treated material.

The following examples are included to further illustrate the invention. They are not limitations thereon.

EXAMPLES

In the following series of examples, four different solid materials (wet and dry activated charcoal, sand and dirt) were tested. These samples are representative of the range of material having different porosities, chemical retention characteristics and toxic remediation applications for which the present invention is suited.

The samples were placed on a glass frit which divided a 2000 ml pyrex glass reaction kettle. The kettle had three screw cap ports, two above the glass frit and one below.

Ozone was delivered through the port below the frit and percolated through the samples. The ozone was produced by the corona discharge method in a Model #GL-1 generator obtained from PCI Ozone and Control Company, West Caldwell, N.J.

Hydrogen peroxide, having a concentration of 35%, was supplied through the two ports located above the frit. The hydrogen peroxide was sprayed through a fitted stopper by means of a hand-held atomizer which delivered ½ ml hydrogen peroxide per injection. One-half milliliter of peroxide was delivered at each of four two-minute intervals. After each test, the samples were decanted through one of the ports above the frit.

The air flow and ozone concentrations were chosen so as to control the reaction rate. The reaction kettle was turned by hand to agitate the media and simulate the folding and turning action of an auger. The test were conducted outdoors, in order to utilize sunlight as a source of UV light.

The top of the kettle contained an additional four ports. Three of these ports (24/40) were sealed, while a fourth center port (34/45) was stoppered and provided with an 11 mm glass tube to vent off-gases. The off-gases were filtered through two 2-liter Erlenmeyer flasks filled with activated charcoal. No evidence of solvents or pesticides was found in testing the charcoal from these filters.

EXAMPLE 1

Samples of 100 grams each of dry activated charcoal, activated charcoal wetted with 100 ml distilled water, silica sand and soil were admixed with 20 ml of gasoline having a density of 0.7028 g/ml. Each sample was treated with 2 ml of hydrogen peroxide. The silica sand was treated with 3.94 g ozone, while the soil sample was treated with 4.91 g and the dry charcoal and wetted charcoal samples were treated with 5.91 g and 6.80 g ozone respectively. 5.33 SCF of air was supplied to each sample. After treatment over a 10 minute residence time, the media samples were evaluated pursuant to EPA Protocols 8015 and 8020. The results are reported in Table 1, where K symbolizes thousand, P.P.M. symbolizes parts per million, and P.P.B. symbolizes parts per billion. N/D stands for not detectable and SCF stands for standard cubic feet.

TABLE 1

| 100 G Activated Charcoal | | EPA 8015 |
|---|---|---|
| $H_2O_2$ | 2 ML | 61.0K P.P.M. |
| $O_3$ | 5.91 G | EPA 8020 |
| Air | 5.33 SCF | Benzene 650.0 P.P.M. Toluene 4.4K P.P.M. Ethylbenzene 920.0 P.P.M. Xylenes 5.1K P.P.M. |
| 100 G Silica Sand | | EPA 8015 |
| $H_2O_2$ | 2 ML | 2.2K P.P.M. |
| $O_3$ | 3.94 G | EPA 8020 |
| Air | 5.33 SCF | Benzene N/D <5.0 P.P.B. Toluene 19.0K P.P.B. Ethylbenzene 13.0K P.P.B. Xylenes 120.0K P.P.B. |
| 100 G "Dirt" | | EPA 8015 |
| $H_2O_2$ | 2 ML | 3.0K P.P.M. |
| $O_3$ | 4.91 G | EPA 8020 |
| Air | 5.33 SCF | Benzene N/D 5.0 P.P.B. Toluene 14.0K P.P.B. Ethylbenzene 15.0K P.P.B. Xylenes 140.0K P.P.B. |
| Wet 100 G Activated Charcoal | | EPA 8015 |
| $H_2O$ | 100 ML Distilled | 71.0K P.P.M. |
| | | EPA 8020 |
| $H_2O_2$ | 2 ML | Benzene 290.0K P.P.B. Toluene 2,600.0K P.P.B. |
| $O_3$ | 6.80 G | Ethylbenzene 680.0K P.P.B. Xylenes 3,800.0K P.P.B. |

EXAMPLE 2

Four 100 mg samples as described in Example 1 were admixed with 20 ml trichloroethylene having a density of 1.4649 g/ml. The samples were treated with 2 ml hydrogen peroxide. The silica sand and soil samples received 2.46 g ozone; the dry activated charcoal sample was treated with 5.91 g ozone, while the wet sample received 6.69 g ozone. 5.33 SCF air was supplied for the activated charcoal samples and 3.33 SCF air was supplied for the remaining samples. After treatment over a 10 minute residence time, the samples were evaluated pursuant to EPA Protocol 8010. The results are reported in Table 2.

TABLE 2

| | | EPA 8010 |
|---|---|---|
| 100 G Activated Charcoal | | |
| $H_2O_2$ | 2 ML | 23.0K P.P.M. |
| $O_3$ | 5.91 G | |
| Air | 5.33 SCF | |
| 100 G Silica Sand | | |
| $H_2O_2$ | 2 ML | 8.0K P.P.M. |
| $O_3$ | 2.46 G | |
| Air | 3.33 SCF | |
| 100 G Dirt | | |
| $H_2O_2$ | 2 ML | 9.2K P.P.M. |
| $O_3$ | 2.46 G | |
| Air | 3.33 SCF | |

TABLE 2-continued

|  |  | EPA 8010 |
|---|---|---|
| Wet 100 G Activated Charcoal | | |
| $H_2O$ | 100 ML Distilled | 57.0K P.P.M. |
| $H_2O_2$ | 2 ML | |
| $O_3$ | 6.69 G | |
| Air | 5.33 SCF | |

EXAMPLE 3

Samples of 100 grams each of dry activated charcoal, activated charcoal wetted with 100 ml distilled water, silica sand and soil were admixed with 20 ml of methanol having a density of 0.7914 g/ml. Each sample was treated with 2 ml of hydrogen peroxide. The silica sand was treated with 3.94 g ozone, while the soil sample was treated with 4.91 g ozone and the charcoal and wetted charcoal samples were treated with 5.91 g and 6.80 g ozone respectively. 5.33 SCF of air was supplied to each sample. After treatment over a 10 minute residence time, the media samples were evaluated pursuant to EPA Protocol 8015 modified for methanol. The results are reported in Table 3.

TABLE 3

|  |  | EPA 8015 Modified for Methanol |
|---|---|---|
| 100 G Activated Charcoal | | |
| $H_2O_2$ | 2 ML | 1.7K P.P.M. |
| $O_3$ | 5.91 G | |
| Air | 5.33 SCF | |
| 100 G Silica Sand | | |
| $H_2O_2$ | 2 ML | Non Detectable |
| $O_3$ | 3.94 G | <1 P.P.M. |
| Air | 5.33 SCF | |
| 100 G "Dirt" | | |
| $H_2O_2$ | 2 ML | Non Detectable |
| $O_3$ | 4.91 G | <1 P.P.M. |
| Air | 5.33 SCF | |
| Wet 100 G Activated Charcoal | | |
| $H_2O$ | 100 ML | 19.6K P.P.M. |
| $H_2O_2$ | 2 ML | |
| $O_3$ | 6.80 G | |
| Air | 5.33 SCF | |

EXAMPLE 4

To demonstrate the efficacy of the inventive method in treatment of pesticide-contaminated media, 50 g samples of activated charcoal and silica sand were admixed with 1 g 4,4'-DDT (in 10 ml methylene chloride). The samples were then allowed to evaporate for one hour at 75° F. Treatment comprised 2 ml hydrogen peroxide and 2.46 g ozone; air supply was 3.33 SCF. Following a ten minute residence, the samples were evaluated using EPA Protocol 8080. The results are reported in Table 4.

TABLE 4

|  |  | EPA 8080 |
|---|---|---|
| 50 G Activated Charcoal | | |
| $H_2O_2$ | 2 ML | 44'DDE 1.6K P.P.M. |
| $O_3$ | 2.46 G | 44'DDT 13.5K P.P.M. |
| Air | 3.33 SCF | |
| 50 G Silica Sand | | |
| $H_2O_2$ | 2 ML | 44'DDE N/D <70.0 P.P.M. |
| $O_3$ | 2.46 G | 44'DDT 8.8K P.P.M. |
| Air | 3.33 SCF | |

EXAMPLE 5

Following the procedure described in Example 3, samples were prepared with 1 g Heptachlor in place of the 4,4'-DDT and treated as described in Example 3. After 10 minutes residence time, the samples were evaluated using EPA Protocol 8080. The results are reported in Table 5.

TABLE 5

|  |  | EPA 8080 |
|---|---|---|
| 50 G Activated Charcoal | | |
| $H_2O_2$ | 2 ML | 9.6K P.P.M. |
| $O_3$ | 2.46 G | |
| Air | 3.33 SCF | |
| 50 G Silica Sand | | |
| $H_2O_2$ | 2 ML | 5.6K P.P.M. |
| $O_3$ | 2.46 | |
| Air | 3.33 SCF | |

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation. Ozone and hydrogen peroxide concentrations and weights temperatures, flow rates and pressures other than those illustrated by the above specification are covered in the spirit of the invention. For example, the process can take place in a vacuum and any suitable device can be used.

What I claim is:

1. A method for treating solid, particulate material that includes contaminants comprising organic substances, said method comprising: evaporating said contaminants and contacting said evaporated contaminants with a gas phase comprising hydroxyl radicals, in an amount and for a time sufficient to remove a substantial portion of said contaminants from said solid, particulate material.

2. The method in accordance with claim 1, wherein the contaminants are organic contaminants.

3. The method in accordance with claim 2, wherein the hydroxyl radicals are produced from ozone.

4. The method in accordance with claim 2, wherein the hydroxyl radicals are produced from hydrogen peroxide.

5. The method in accordance with claim 4, wherein the amount of hydrogen peroxide is from about 8.0:1 to about 1:1, based on the weight of the contaminated material and the hydrogen peroxide, respectively.

6. The method in accordance with claim 5, wherein the amount of hydrogen peroxide is from about 5.0:1 to about 2.2:1 based on the weight of the contaminated material and the hydrogen peroxide, respectively.

7. The method in accordance with claim 5, wherein the hydroxyl radicals are produced from hydrogen peroxide in the presence of up to 3% ozone, based on the composition of the gas phase.

8. The method in accordance with claim 4, wherein the gas phase hydroxyl radicals are produced from hydrogen peroxide in the presence of ozone and UV light.

9. The method in accordance with claim 8, wherein the particulate material is soil, sand or activated charcoal.

10. The method in accordance with claim 9, wherein the organic contaminant comprises a hydrocarbon containing from one to eighteen carbon atoms, a hydroxyl containing derivative of a hydrocarbon containing from one to eighteen carbon atoms, a halogen containing derivative of a hydrocarbon containing from one to eighteen carbon atoms.

11. The method in accordance with claim 9, wherein the organic contaminant is a pesticide.

12. A method for treating solid, particulate material including contaminants comprising organic substances, said method comprising: placing said contaminated material in a first treatment hopper, evaporating at least a portion of said contaminants, contacting said evaporated contaminants with a first gas phase comprising hydroxyl radicals, in an amount and for a time sufficient to initiate oxidation of the contaminants, transferring said thus partially treated contaminants to a second treatment hopper, further contacting evaporated contaminants with a second gas phase comprising hydroxyl radicals, in an amount and for a time sufficient to maintain the oxidation, and cycling the resulting solid particulate material including contaminants between the first and second treatment hoppers, each time treating with gas phase hydroxyl radicals in an amount effective to maintain the oxidation of evaporated contaminants, until a substantial quantity of said organic contaminants have been removed.

13. The method in accordance with claim 12, wherein the contaminants are organic contaminants.

14. The method in accordance with claim 13, wherein the hydroxyl radicals in each-gas phase are produced from ozone.

15. The method in accordance with claim 13, wherein the hydroxyl radicals in each-gas phase are produced from hydrogen peroxide.

16. The method in accordance with claim 15, wherein the hydroxyl radicals in each gas phase are produced from hydrogen peroxide in the presence of up to 3% ozone, based on the composition of each gas phase.

17. The method in accordance with claim 15 wherein the gas phase hydroxyl radicals are produced from hydrogen peroxide in the presence of ozone and UV light.

18. The method in accordance with claim 17, wherein the particulate material is soil, sand or activated charcoal.

19. The method in accordance with claim 18, wherein the organic contaminant is a hydrocarbon containing from one to eighteen carbon atoms, a hydroxyl containing derivative of a hydrocarbon containing from one to eighteen carbon atoms, a halogen containing derivative of a hydrocarbon containing from one to eighteen carbon atoms.

20. The method in accordance with claim 18, wherein the organic contaminant is a pesticide.

21. An apparatus for treating solid, particulate materials comprising contaminants including organic substances comprising a first transfer means for introducing said contaminated material into a first treatment hopper through a first hopper entry port, said first treatment hopper having a top and bottom, a first means for evaporating at least a portion of said contaminants, and contacting said evaporated contaminants in said first treatment hopper with a gas phase comprising hydroxyl radicals in an amount effective to oxidize a substantial quantity of said evaporated contaminants, second transfer means for moving treated material from said first treatment hopper, through a first treatment hopper exit port, then through a second treatment hopper entry port into a second treatment hopper, a second means for contacting evaporated contaminants in said second treatment hopper with a gas phase comprising hydroxyl radicals in an amount effective to maintain said oxidation, a third transfer means for moving treated material from said second treatment hopper, through a second treatment hopper exit port, then through a first treatment hopper return port, back to said first treatment hopper.

22. The apparatus in accordance with claim 21, wherein the contaminants are organic contaminants.

23. The apparatus in accordance with claim 22, wherein said first and second means for producing an effective amount hydroxyl radicals in the gas phase comprise a tank for storing hydrogen peroxide, connected by hydrogen peroxide supply lines to spray nozzles located above the first and second treatment tank entry ports, and means for regulating the pressure through the spray nozzles.

24. The apparatus in accordance with claim 22, wherein said second and third transfer means are covered, soil augers.

25. The apparatus in accordance with claim 22, further comprising means for heating said covered, soil augers.

26. The apparatus in accordance with claim 22, further comprising means for introducing ozone into the gas phase used to contact evaporated contaminants in the first and second treatment hoppers.

27. The apparatus in accordance with claim 22, further comprising said first and second treatment hoppers each having at least one UV light port to permit UV light to enter the first and second treatment hoppers.

* * * * *